(12) United States Patent
Sun et al.

(10) Patent No.: US 7,144,315 B1
(45) Date of Patent: Dec. 5, 2006

(54) GRINDING WHEEL

(75) Inventors: Yung-yung Sun, Dali (TW); Chuan-ching Cheng, Taichung (TW)

(73) Assignee: Storm Pneumatic Tool Co., Ltd., Taichung County (TW)

( * ) Notice: Subject to any disclaimer, the term of this patent is extended or adjusted under 35 U.S.C. 154(b) by 0 days.

(21) Appl. No.: 11/197,409

(22) Filed: Aug. 5, 2005

(51) Int. Cl.
*B24B 45/00* (2006.01)
*F16F 15/00* (2006.01)

(52) U.S. Cl. .................. 451/541; 451/548; 451/359

(58) Field of Classification Search ............. 451/541, 451/548, 359, 342
See application file for complete search history.

(56) References Cited

U.S. PATENT DOCUMENTS

| | | | | |
|---|---|---|---|---|
| 260,336 A | * | 6/1882 | Thayer | 451/342 |
| 3,036,412 A | * | 5/1962 | Tocci-Guilbert | 451/342 |
| 3,183,633 A | * | 5/1965 | Decker | 451/541 |
| 3,623,275 A | * | 11/1971 | Koella | 451/541 |
| 3,793,782 A | * | 2/1974 | Bowling | 451/358 |
| 4,406,202 A | * | 9/1983 | Salje et al. | 83/835 |
| 6,110,027 A | * | 8/2000 | Muller | 451/359 |
| 6,309,292 B1 | * | 10/2001 | Montabaur et al. | 451/542 |

* cited by examiner

Primary Examiner—M. Rachuba
(74) Attorney, Agent, or Firm—Rosenberg, Klein & Lee (57) ABSTRACT

A grinding wheel including a ring-shaped wheel, a first fixing cap, a second fixing cap and a buffer member. The ring-shaped wheel has a fixing section and a working section formed along outer circumference of the fixing section. The first and second fixing caps are respectively mounted on two sides of the fixing section. The buffer member is positioned between the first and second fixing caps for reducing shock produced in operation. The circumference of the buffer member is formed with multiple movable vanes. When the grinding wheel is rotated at high speed, the centrifugal force will deform the movable vanes of the buffer member to lean on the ring-shaped wheel for supporting the working section thereof.

6 Claims, 10 Drawing Sheets

GRINDING WHEEL

BACKGROUND OF THE INVENTION

The present invention is related to a grinding wheel installable on a grinder. The grinding wheel is equipped with an internal buffer member for reducing shock.

Figure 8:
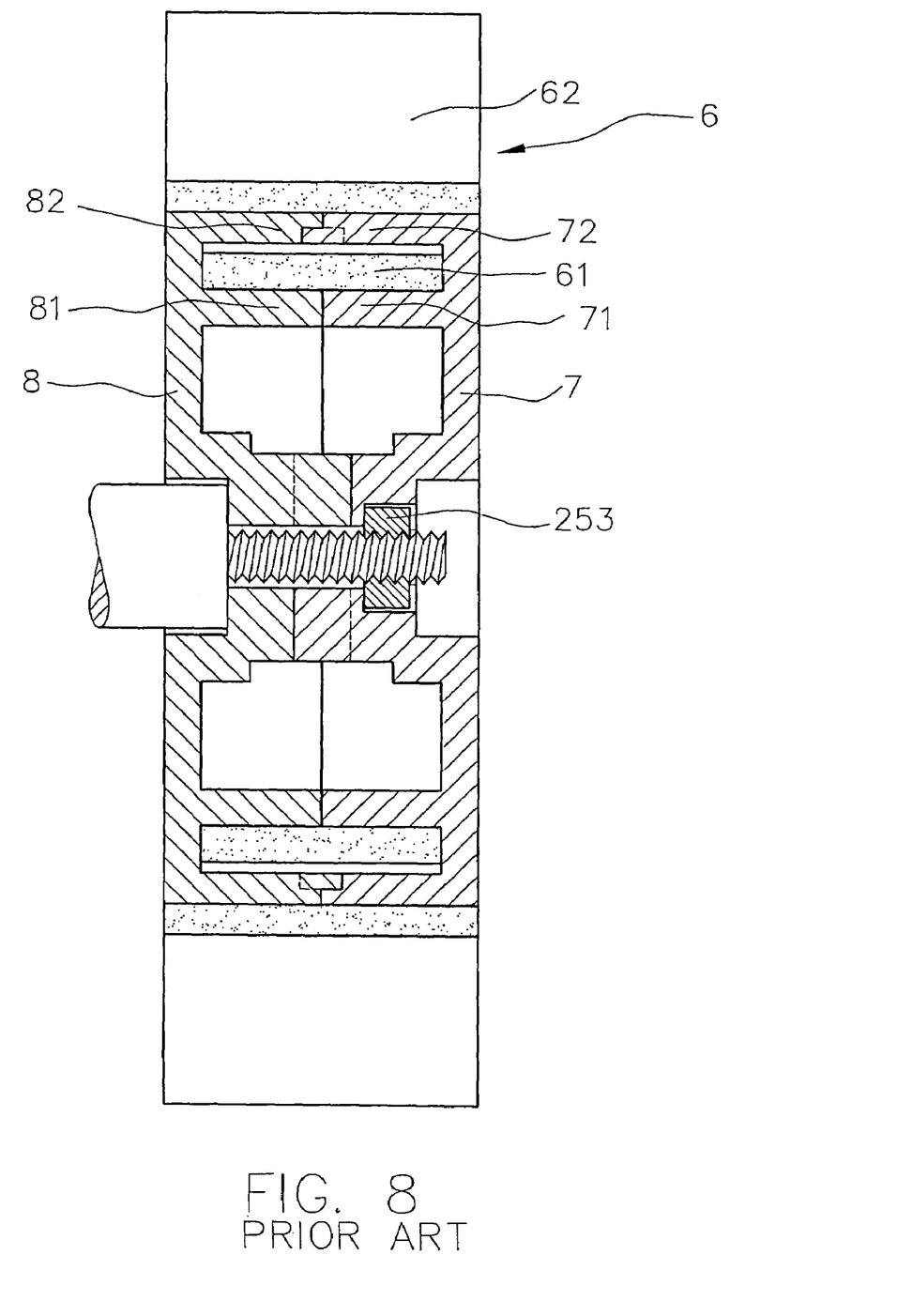
FIG. 8 is a side sectional view of a first conventional grinding wheel.
Figure 9:
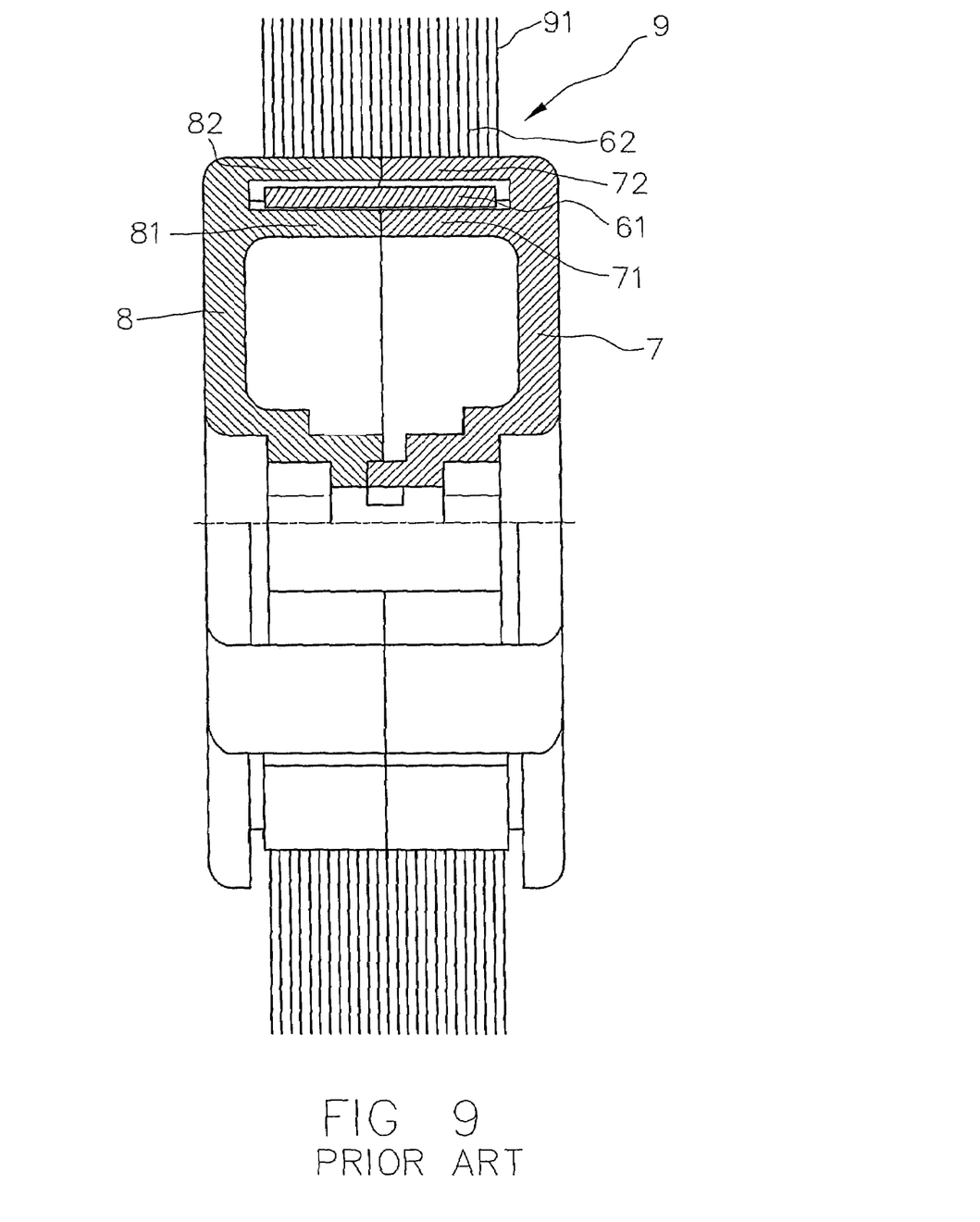
FIG. 9 is a side sectional view of a second conventional grinding wheel.
Figure 10:
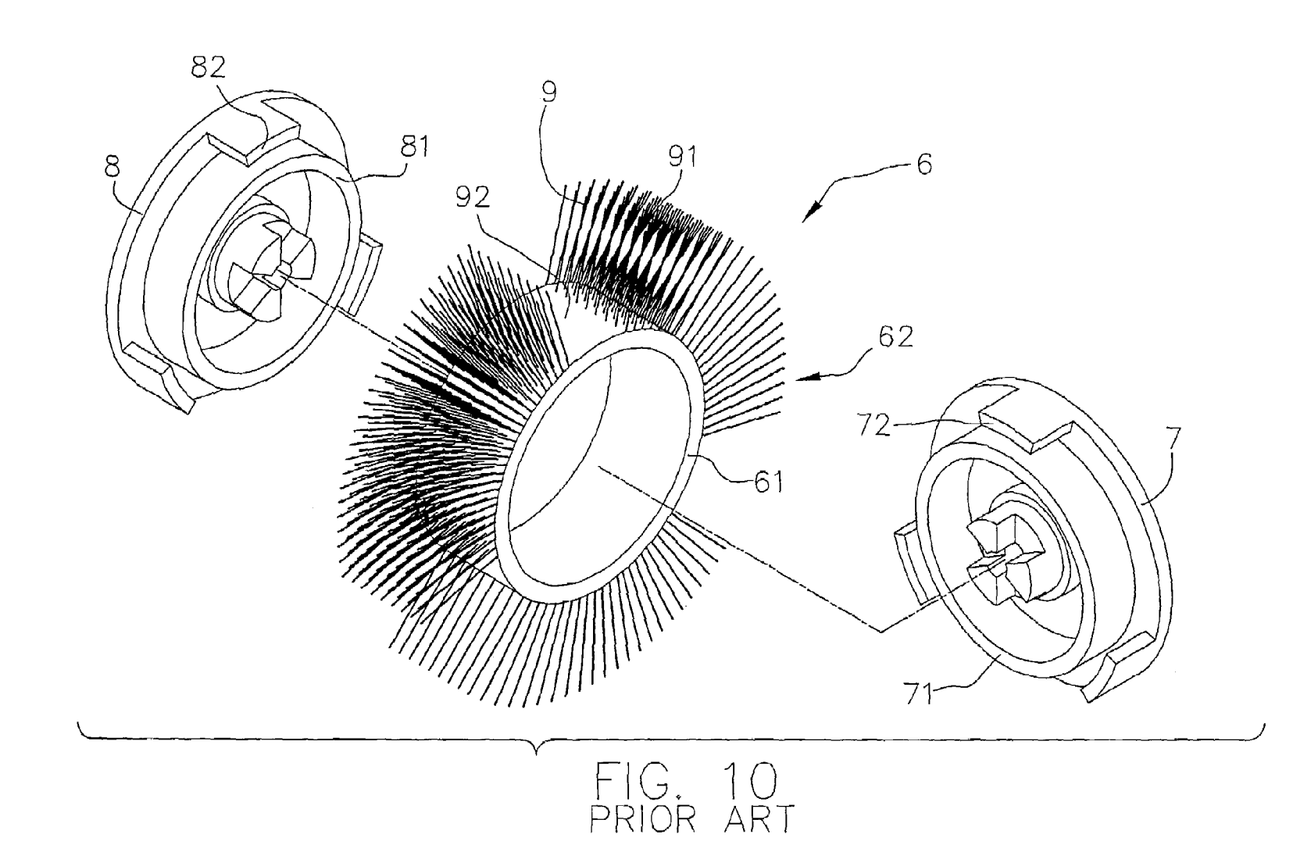
FIG. 10 is a perspective exploded view of the second conventional grinding wheel.

FIGS. 8 to 10 show a conventional grinding wheel structure installed on a grinder. The grinding wheel structure includes a ring-shaped wheel 6, a first fixing cap 7 and a second fixing cap 8. The inner circumference of the ring-shaped wheel 6 has a fixing section 61. A working section 62 is arranged on outer circumference of the fixing section 61. The fixing section 61 is fixed with the first and second fixing caps 7, 8.

The above grinding wheel is installable on a grinder for grinding a work piece. When grinding a hard work piece such as a metal piece with irregular surface, a shocking force will be transmitted to an operator. Therefore, it is hard and laborious for the operator to operate and control the grinder.

Moreover, each fixing cap 7, 8 has a support ring 71, 81. Multiple ribs 72, 82 are arranged on outer circumference of the support ring 71, 81 and spaced from the support ring 71, 81. The ring-shaped wheel 6 is fixed between the support rings 71, 81 and the ribs 72, 82. In the case that the ring-shaped wheel 6 of the grinding wheel is a steel wire wheel 9, the steel wires 91 will be partially interrupted by the ribs 72, 82. Therefore, in actual manufacturing of the steel wire wheel 9, the steel wire wheel 9 will have several notches 92 free from the steel wire 91 as shown in FIG. 10. This will reduce the grinding effect.

SUMMARY OF THE INVENTION

It is therefore a primary object of the present invention to provide a grinding wheel having an internal buffer member made of deformable soft material. When grinding a work piece with a grinder, the shock produced in operation can be effectively absorbed by the buffer member. Therefore, an operator can more easily operate the grinder with less strength. Furthermore, when the grinding wheel is rotated at high speed, the centrifugal force will make the buffer member deform, whereby the circumference of the buffer member will lean on the wall of the shaft hole of the grinding wheel. Accordingly, the buffer member can support the working section of the grinding wheel.

It is a further object of the present invention to provide the above grinding wheel in which an annular connecting section is formed along outer circumference of the fixing section to connect with the annular working section of the ring-shaped wheel. Therefore, the working section will not be interrupted by the projecting sections of the fixing caps. Accordingly, the working section can be manufactured without any notch free from the steel wire.

According to the above objects, the grinding wheel of the present invention includes:

a ring-shaped wheel having a fixing section, a working section being formed along outer circumference of the fixing section, the fixing section of the ring-shaped wheel being formed with a shaft hole, two annular grooves being respectively formed on two sides of the ring-shaped wheel along the circumference of the shaft hole, multiple axially extending recesses being formed on inner circumferential wall of the shaft hole, the recesses extending from one side of the ring-shaped wheel to the other side thereof and communicating with the annular grooves;

a first fixing cap which is a disc member having an inner face, the inner face of the first fixing cap having multiple projecting sections extending from the circumference of the inner face in the same direction, a free end of each projecting section being formed with a projection, the first fixing cap having a central seat body extending in the same direction as the projecting sections, the seat body being formed with a central through hole, fixed ends of the projecting sections and the seat body being simply connected by a connecting board, a space being defined between the projecting sections and the seat body;

a second fixing cap which is a disc member having an inner face, the inner face of the second fixing cap having multiple projecting sections extending from the circumference of the inner face in the same direction, a free end of each projecting section being formed with a dent complementary to the projection of the first fixing cap, the second fixing cap also having a central seat body extending in the same direction as the projecting sections, the seat body being formed with a central through hole, fixed ends of the projecting sections and the seat body being simply connected by a connecting board, a space being defined between the projecting sections and the seat body; and a buffer member made of deformable soft material and fixedly positioned in the spaces between the first and second fixing caps, the buffer member being formed with a central through hole, a circumference of the buffer member being formed with multiple grooves extending through the buffer member from one side to the other side, a movable vane being defined between each two adjacent grooves, when the grinding wheel is rotated, the movable vanes of the buffer member leaning on the wall of the shaft hole of the ring-shaped wheel, whereby when assembled, the projecting sections of the first and second fixing caps are fitted into the recesses of the ring-shaped wheel from two sides thereof, the projecting sections abutting against each other with the projections of the first fixing cap extending into the dents of the second fixing cap, the seat bodies of the first and second fixing caps also abutting against each other.

The present invention can be best understood through the following description and accompanying drawings wherein:

DETAILED DESCRIPTION OF THE PREFERRED EMBODIMENTS

Please refer to FIGS. 1 to 5. The grinding wheel structure of the present invention includes a ring-shaped wheel 1 having a fixing section 11. A working section 12 is formed along outer circumference of the fixing section 11. The working section 12 and the fixing section 11 of the ring-shaped wheel 1 are integrally formed and made of the same material such as rubber.

The fixing section 11 of the ring-shaped wheel 1 is formed with a shaft hole 111. Two annular grooves 112 are respectively formed on two sides of the ring-shaped wheel 1 along the circumference of the shaft hole 111. Multiple axially extending recesses 113 are formed on inner circumferential wall of the shaft hole 111. The recesses 113 extend from one side of the ring-shaped wheel 1 to the other side thereof and communicate with the annular grooves 112. An annular rib section 121 is formed on the working section 12 of the ring-shaped wheel 1 at the middle of the axis of the ring-shaped wheel 1. Multiple projecting blocks 122 are respectively formed on two sides of the annular rib section 121 at equal intervals. The projecting blocks 122 on two sides of the annular rib section 121 are interlaced to enhance the strength of the working section 12.

In this embodiment, the ring-shaped wheel 1 is fixedly clamped between two fixing caps 2, 3.

The first fixing cap 2 is a disc member having an inner face 21. The inner face 21 has multiple projecting sections 23 extending in the same direction. A free end of each projecting section 23 is formed with a projection 231. The first fixing cap 2 has a central seat body 24 extending in the same direction as the projecting sections 23. The seat body 24 is formed with a central through hole 25. The fixed ends of the projecting sections 23 and the seat body 24 are simply connected by a connecting board 26. A space 27 is defined between the projecting sections 23 and the seat body 24.

The second fixing cap 3 has an inner face 31. Multiple projecting sections 33 extend from the circumference of the inner face 31 in the same direction. A free end of each projecting sect ion 33 is formed with a dent 331 complementary to the projection 231 of the first fixing cap 2, whereby the projection 231 can be inserted into the dent 231. The second fixing cap 3 also has a central seat body 34 extending in the same direction as the projecting sections 33. The seat body 34 is formed with a central through hole 35. The fixed ends of the projecting sections 33 and the seat body 34 are simply connected by a connecting board 36. A space 37 is defined between the projecting sections 33 and the seat body 34.

The centers of the outer faces 22, 32 of the first and second fixing caps 2, 3 are respectively formed with circular caves 251, 351 around the through holes 25, 35 of the seat bodies 24, 34. A hexagonal depression 252 is formed on bottom wall of the circular cave 251 of the first fixing cap 2. A hexagonal nut 253 can be mounted in the hexagonal depression 252 and screwed on a connecting thread rod A of the grinder.

When assembled, the projecting sections 23, 33 of the first and second fixing caps 2, 3 are fitted into the recesses 113 of the ring-shaped wheel 1 from two sides thereof. The projecting sections 23, 33 abut against each other with the projections 231 of the first fixing cap 2 extending into the dents 331 of the second fixing cap 3. In addition, the seat bodies 24, 34 of the first and second fixing caps 2, 3 also abut against each other.

A buffer member 4 is fixedly positioned in the spaces 27, 37 between the first and second fixing caps 2, 3.

The buffer member 4 is formed with a central through hole 41. The circumference of the buffer member 4 is formed with multiple grooves 42 extending through the buffer member 4 from one side to the other side. A movable vane 44 is defined between each two adjacent grooves 42. The buffer member 4 is made of deformable soft material such as rubber. A hard metal bush 43 is inlaid in the through hole 41 of the buffer member 4.

When grinding a work piece with the grinder, the shock produced in operation can be effectively absorbed by the buffer member 4. Therefore, an operator can more easily operate the grinder with less strength.

Figure 1:
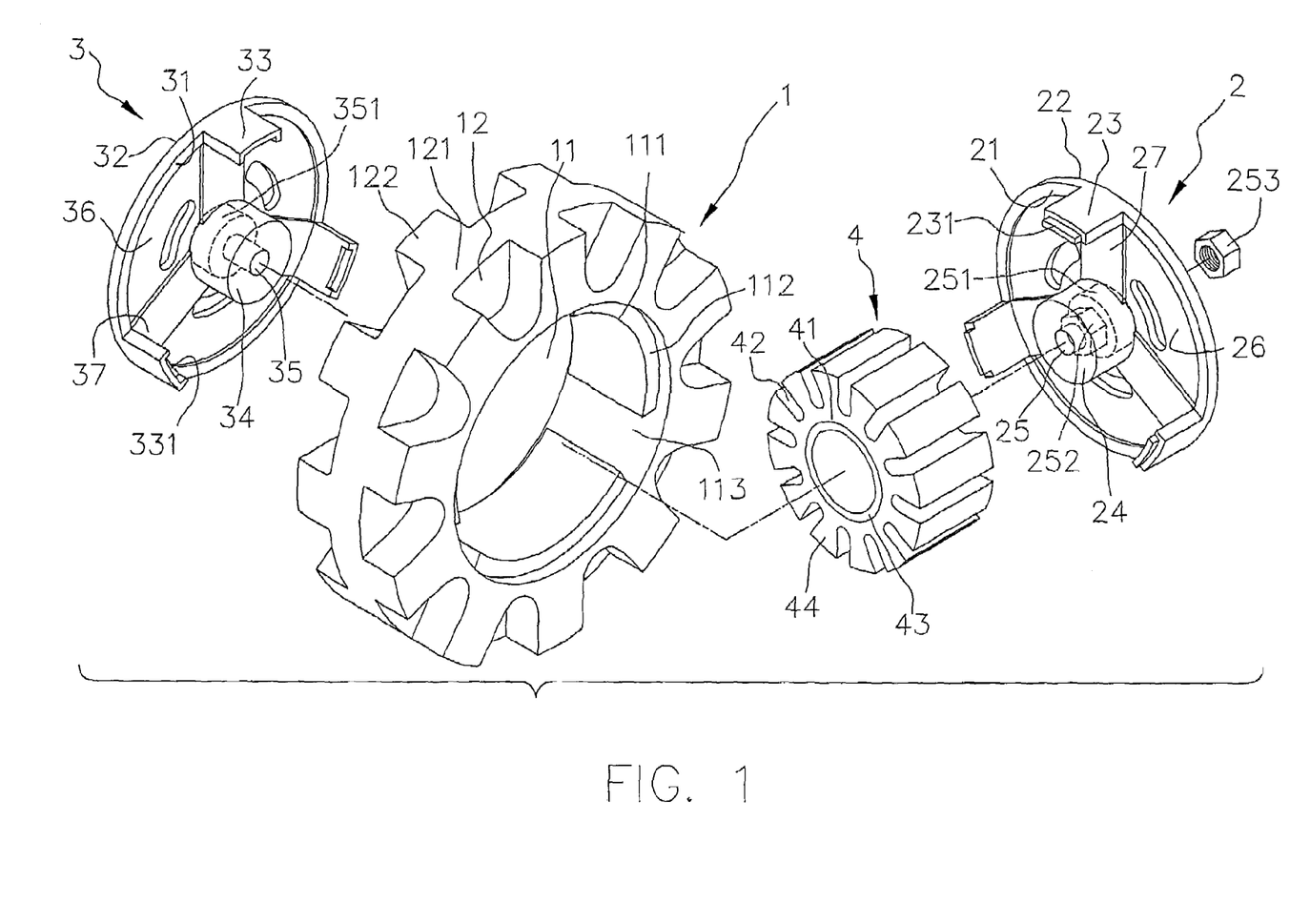
FIG. 1 is a perspective exploded view of the present invention.
Figure 2:
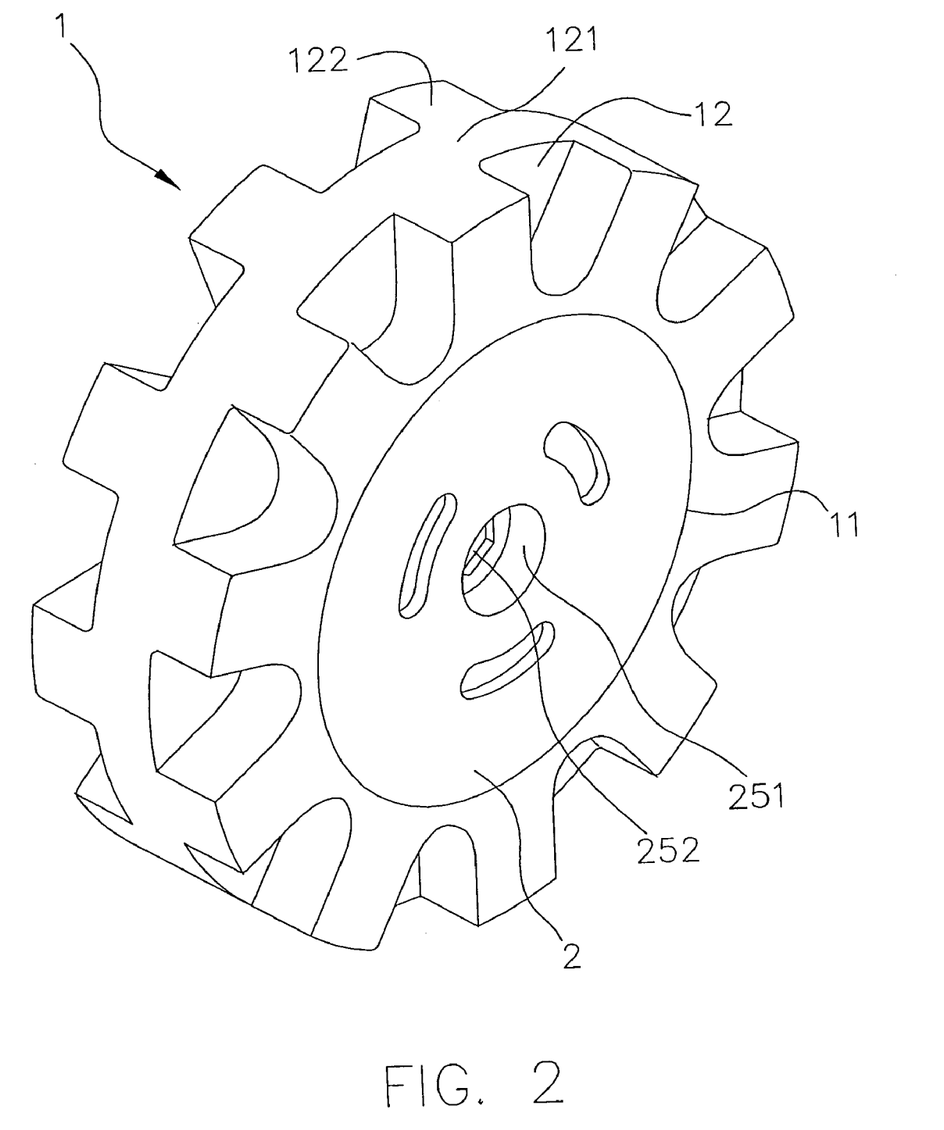
FIG. 2 is a perspective assembled view of the present invention.
Figure 3:
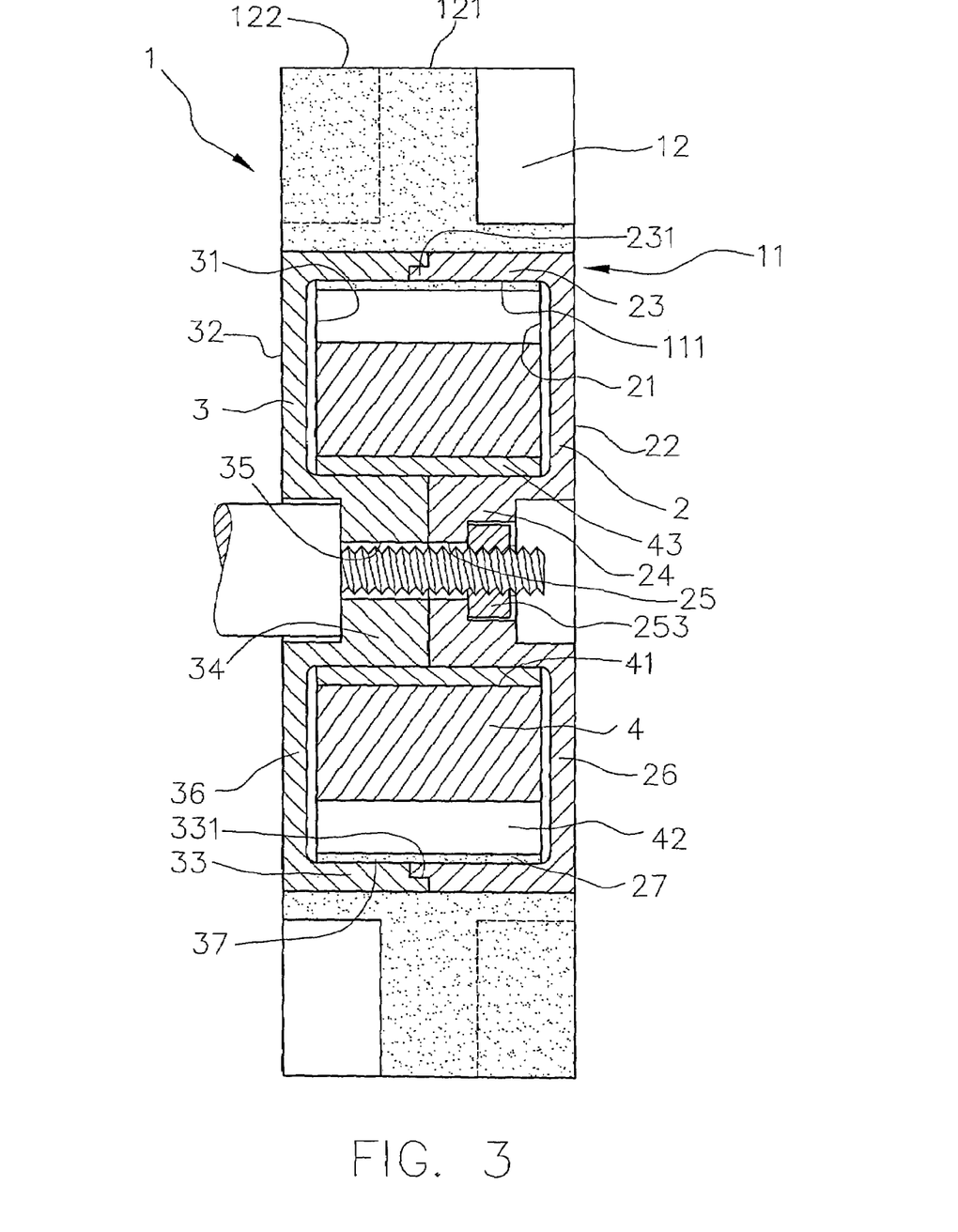
FIG. 3 is a side sectional view of the present invention.
Figure 4:
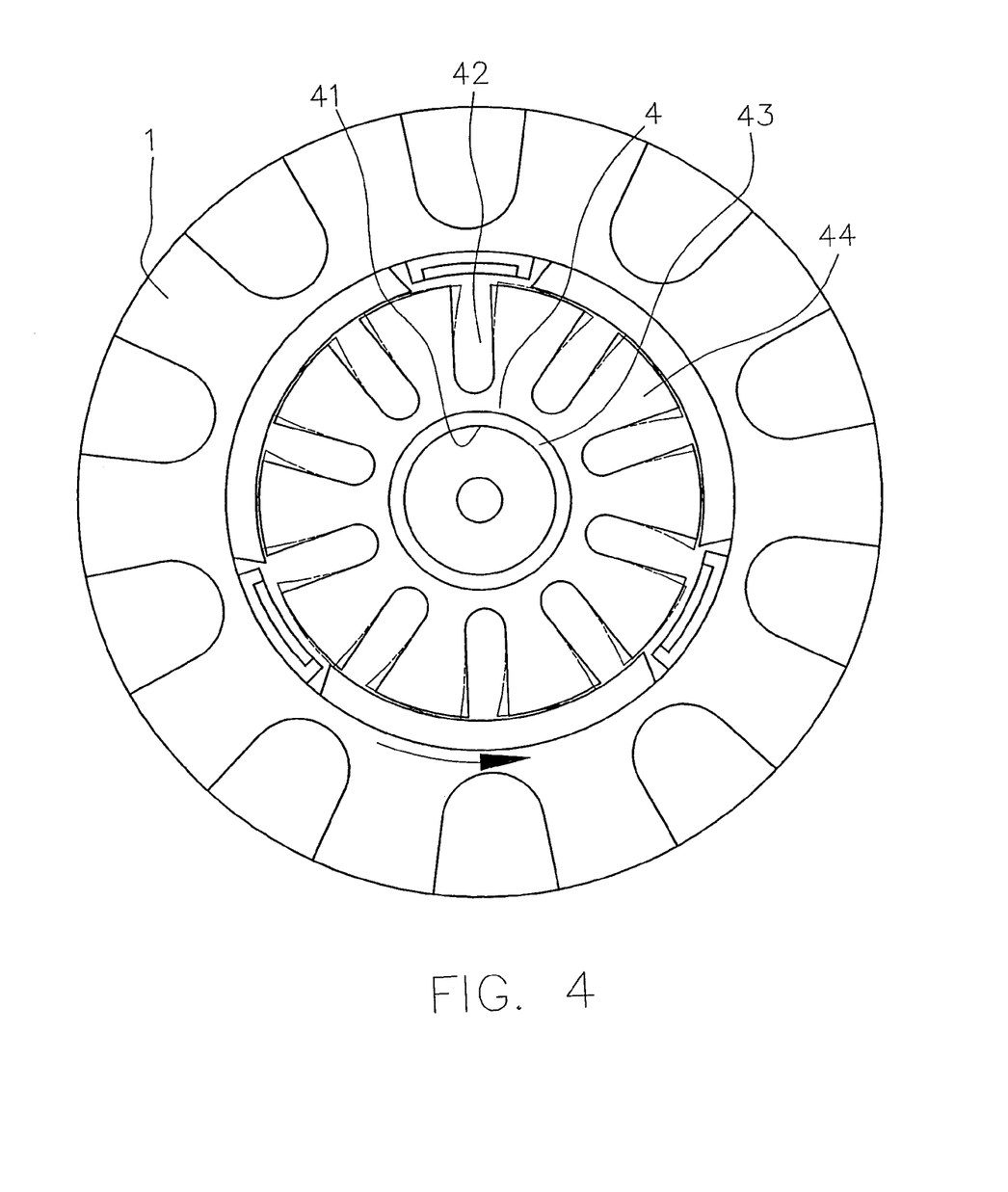
FIG. 4 shows the rotation of the grinding wheel of the present invention.
Figure 5:
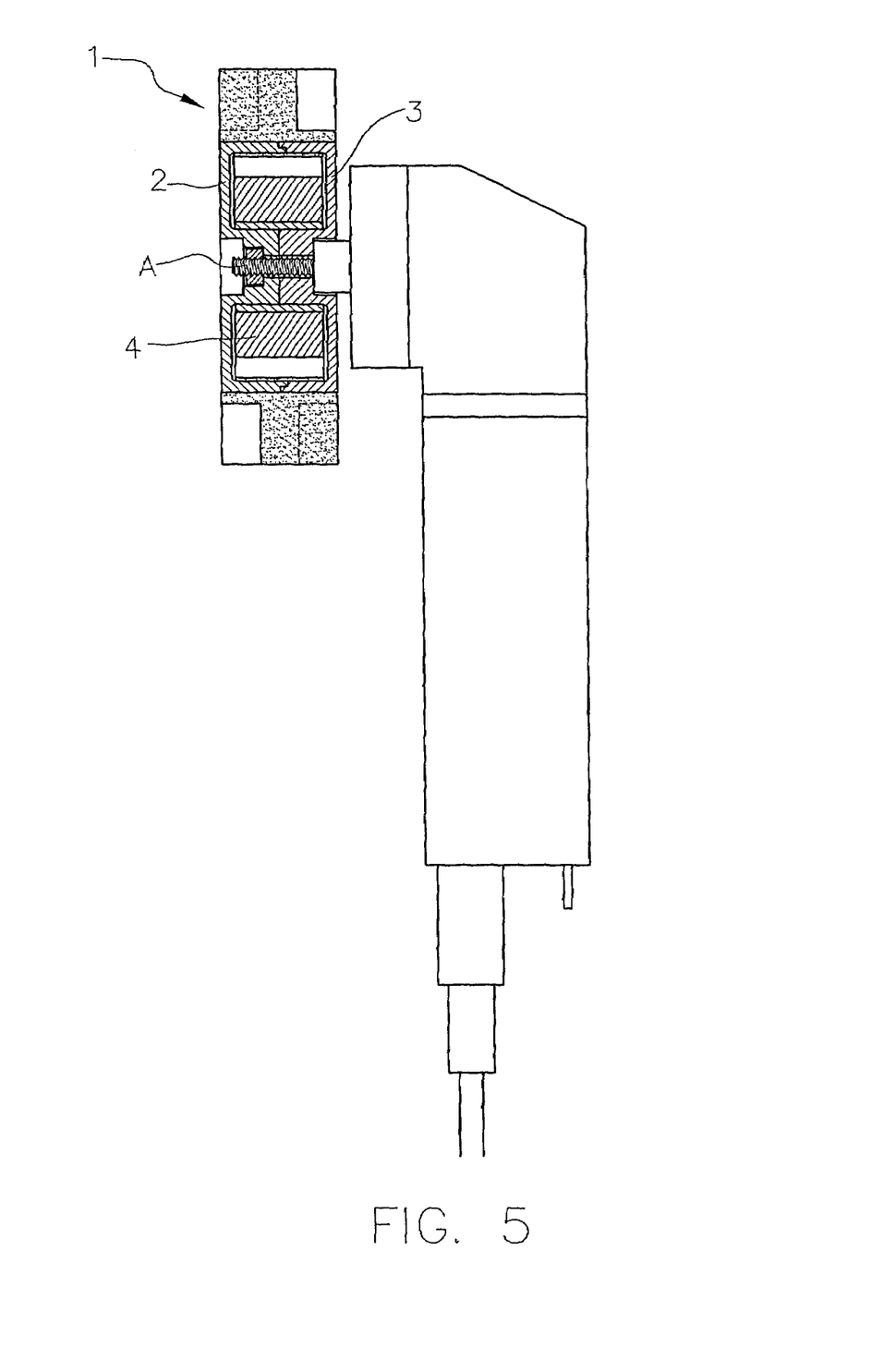
FIG. 5 shows the installation of the grinding wheel of the present invention.

Furthermore, when the grinding wheel is rotated at high speed, the centrifugal force will make the rims of the movable vanes 44 of the buffer member 4 lean on the wall of the shaft hole 111 of the ring-shaped wheel 1. Accordingly, the buffer member 4 can support the working section of the grinding wheel.

Figure 6:
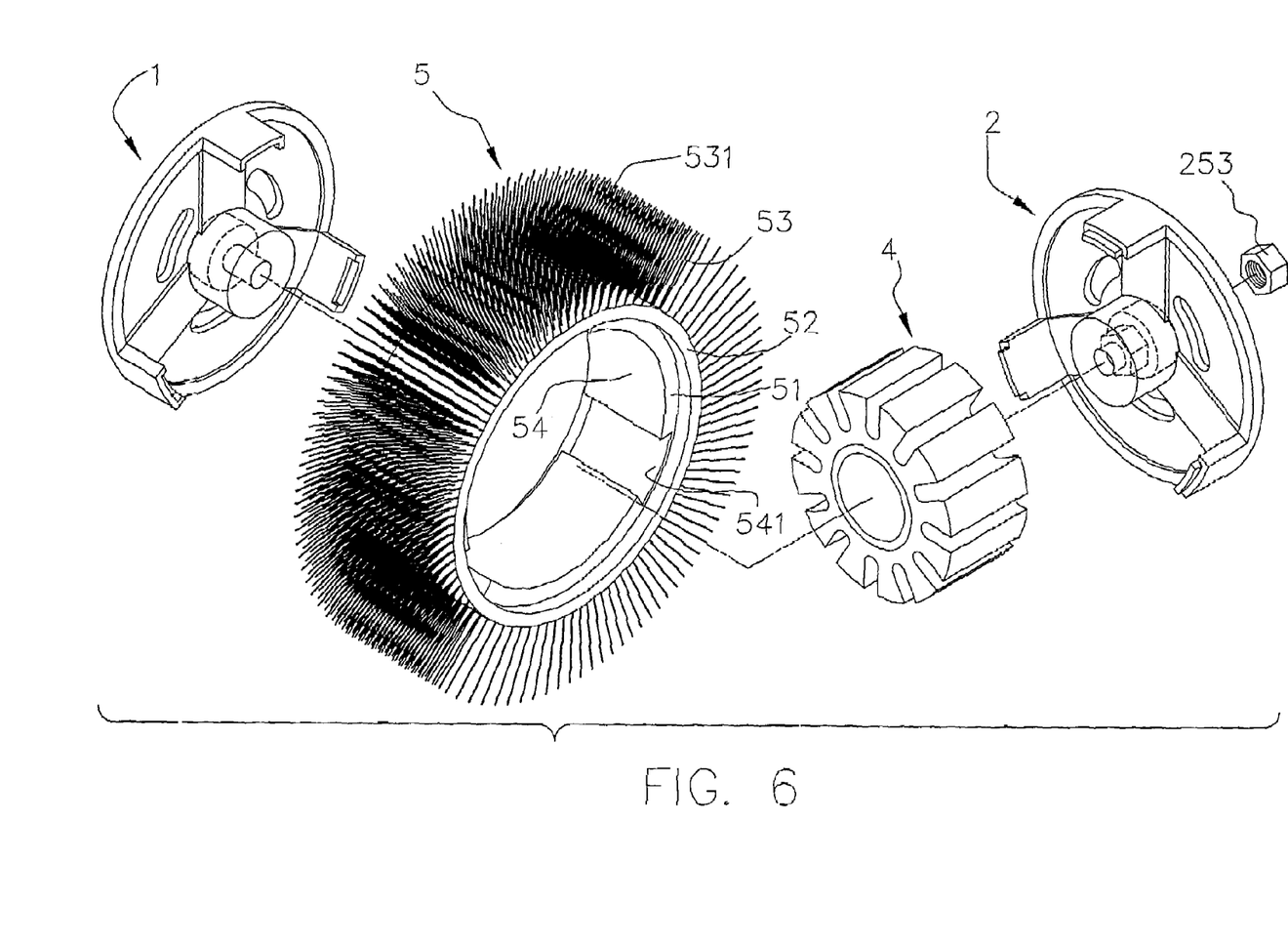
FIG. 6 is a perspective exploded view of a second embodiment of the present invention.
Figure 7:
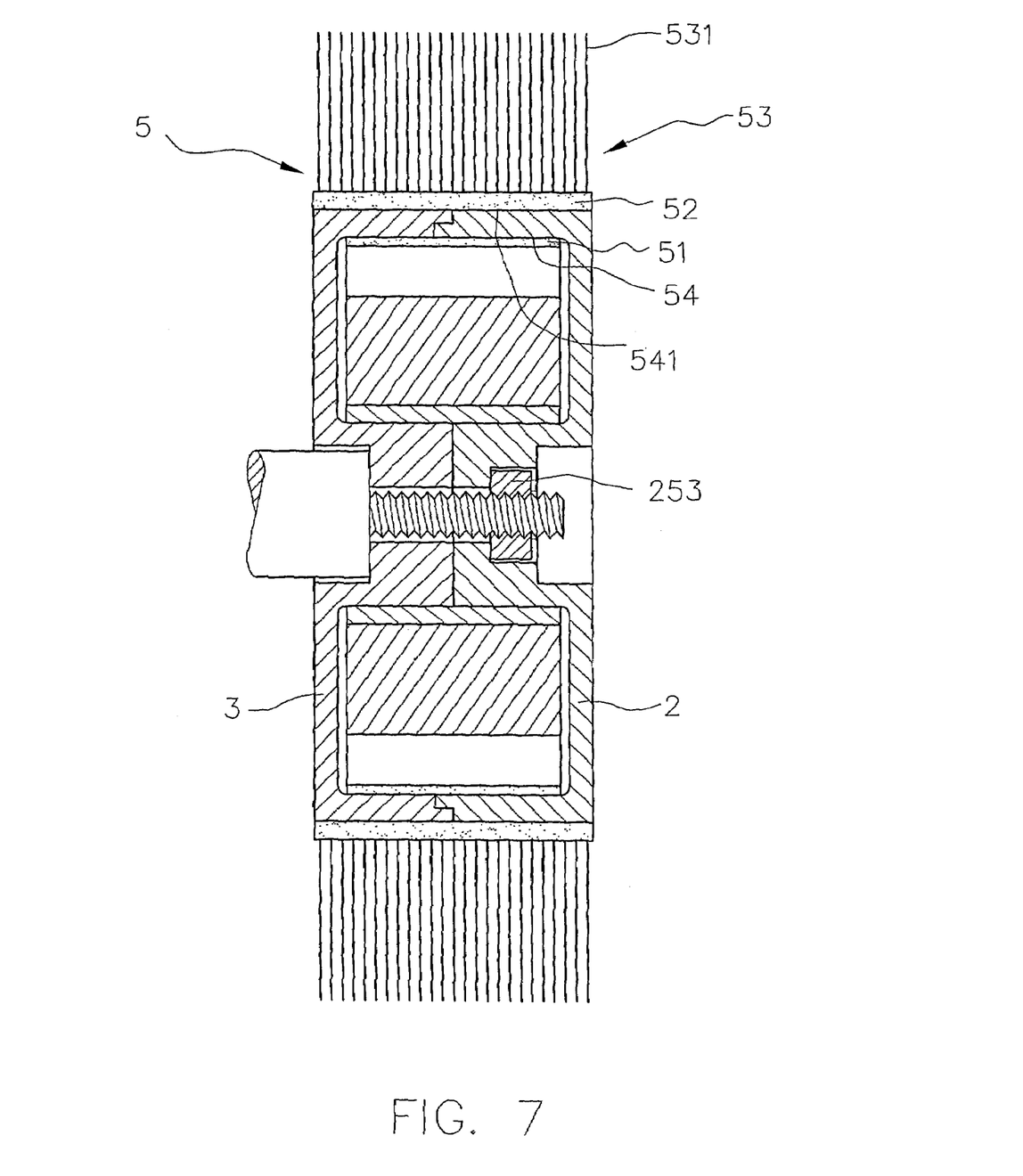
FIG. 7 is a side sectional view of the second embodiment of the present invention.

FIGS. 6 and 7 show a second embodiment of the ring-shaped wheel of the present invention. The ring-shaped wheel 5 has a fixing section 51, a connecting section 52 and a working section 53 from inner side to outer side. The inner circumferential wall of the shaft hole 54 of the ring-shaped wheel 5 is formed with multiple axially extending recesses 541. The recesses 541 communicate with the shaft hole 54. The annular connecting section 52 is formed along outer circumference of fixing section 51 to connect with the annular working section 53. The working section 53 includes multiple radial steel wires 531 implanted in the outer circumference of the connecting section 52. The connecting section 52 of the ring-shaped wheel 5 is positioned between the fixing section 51 and the working section 53 so that the working section 53 will not be interrupted by the projecting sections 23, 33 of the two fixing caps 2, 3. Therefore, the working section 53 can be manufactured without any notch free from the steel wire 531.

The above embodiments are only used to illustrate the present invention, not intended to limit the scope thereof. Many modifications of the above embodiments can be made without departing from the spirit of the present invention.

What is claimed is:

1. A grinding wheel comprising:
    a ring-shaped wheel having a fixing section, a working section being formed along outer circumference of the fixing section, the fixing section of the ring-shaped wheel being formed with a shaft hole, two annular grooves being respectively formed on two sides of the ring-shaped wheel along the circumference of the shaft hole, multiple axially extending recesses being formed on inner circumferential wall of the shaft hole, the recesses extending from one side of the ring-shaped wheel to the other side thereof and communicating with the annular grooves;
    a first fixing cap which is a disc member having an inner face, the inner face of the first fixing cap having multiple projecting sections extending from the circumference of the inner face in the same direction, a free end of each projecting section being formed with a projection, the first fixing cap having a central seat body extending in the same direction as the projecting sections, the seat body being formed with a central through hole, fixed ends of the projecting sections and the seat body being simply connected by a connecting board, a space being defined between the projecting sections and the seat body;

a second fixing cap which is a disc member having an inner face, the inner face of the second fixing cap having multiple projecting sections extending from the circumference of the inner face in the same direction, a free end of each projecting section being formed with a dent complementary to the projection of the first fixing cap, the second fixing cap also having a central seat body extending in the same direction as the projecting sections, the seat body being formed with a central through hole, fixed ends of the projecting sections and the seat body being simply connected by a connecting board, a space being defined between the projecting sections and the seat body; and a buffer member made of deformable soft material and fixedly positioned in the spaces between the first and second fixing caps, the buffer member being formed with a central through hole, a circumference of the buffer member being formed with multiple grooves extending through the buffer member from one side to the other side, a movable vane being defined between each two adjacent grooves, when the grinding wheel is rotated, the movable vanes of the buffer member leaning on the wall of the shaft hole of the ring-shaped wheel, whereby when assembled, the projecting sections of the first and second fixing caps are fitted into the recesses of the ring-shaped wheel from two sides thereof, the projecting sections abutting against each other with the projections of the first fixing cap extending into the dents of the second fixing cap, the seat bodies of the first and second fixing caps also abutting against each other.

2. The grinding wheel as claimed in claim 1, wherein the working section and the fixing section of the ring-shaped wheel are integrally formed and made of the same material.

3. The grinding wheel as claimed in claim 2, wherein an annular rib section is formed on the working section of the ring-shaped wheel at the middle of the axis of the ring-shaped wheel, multiple projecting blocks being respectively formed on two sides of the annular rib section at equal intervals, the projecting blocks on two sides of the annular rib section being interlaced.

4. The grinding wheel as claimed in claim 2, wherein a hard metal bush is inlaid in the through hole of the buffer member.

5. The grinding wheel as claimed in claim 1, wherein centers of outer faces of the first and second fixing caps are respectively formed with circular caves around the through holes of the seat bodies, a hexagonal depression being formed on bottom wall of the circular cave of the first fixing cap.

6. The grinding wheel as claimed in claim 1, wherein the ring-shaped wheel has a fixing section, a connecting section and a working section from inner side to outer side, the working section including multiple radial steel wires implanted in outer circumference of the connecting section.

* * * * *